United States Patent [19]

Logsdon

[11] Patent Number: 4,923,349

[45] Date of Patent: May 8, 1990

[54] THREADED SPLIT COUPLING NUT

[76] Inventor: Hartley Logsdon, 965 Churchill Rd., West Palm Beach, Fla. 33405

[21] Appl. No.: 738,303

[22] Filed: May 28, 1985

[51] Int. Cl.⁵ ............................................. F16L 19/00
[52] U.S. Cl. ..................................... 411/433; 285/387; 285/419
[58] Field of Search ....................... 285/387, 419, 388; 411/433, 432

[56] References Cited

U.S. PATENT DOCUMENTS

| | | | |
|---|---|---|---|
| 284,096 | 8/1883 | Walter | 285/419 |
| 1,082,993 | 12/1913 | Beattie | 411/433 |
| 2,403,839 | 9/1946 | Adolph | 285/419 X |
| 2,563,366 | 8/1951 | Raymond | 285/387 |
| 2,650,180 | 8/1953 | Walker | 285/419 X |
| 2,714,424 | 8/1955 | Atkinson | 285/419 X |
| 3,181,896 | 5/1965 | Russell | 285/387 X |
| 3,515,415 | 6/1970 | Clark et al. | 285/387 X |
| 4,226,164 | 10/1980 | Carter | 285/387 X |
| 4,258,944 | 3/1981 | Wendel | 285/387 X |
| 4,516,278 | 5/1985 | Lamond | 285/387 X |

FOREIGN PATENT DOCUMENTS

| | | | |
|---|---|---|---|
| 142343 | 5/1920 | United Kingdom | 285/419 |
| 455165 | 10/1936 | United Kingdom | 411/432 |

Primary Examiner—Thomas F. Callaghan
Attorney, Agent, or Firm—Malin, Haley & McHale

[57] ABSTRACT

The threaded split coupling nut system includes a threaded split coupling nut and coupling clamps. The threaded split-slip nut coupling has conventional nut shape but is split. The gripping nodules on the body are positioned parallel to the rotational center line of the split-slip nut coupling. The gripping nodules are formed as an integral past of the conventional and old slip nut coupling design. The gripping nodules are connected to or formed on the outside surface of the threaded split-slip nut coupling and the gripping nodules project outward in a radial direction from the rotational center line of the split-slip nut coupling. The conventional threaded split-slip nut coupling has been divided into two equal parts along a plane containing the rotational center line.

2 Claims, 1 Drawing Sheet

U.S. Patent      May 8, 1990      4,923,349
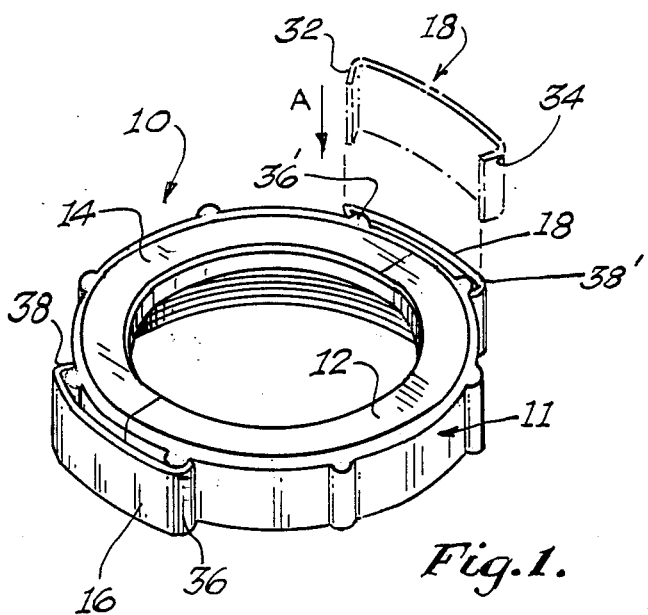
Fig.1.
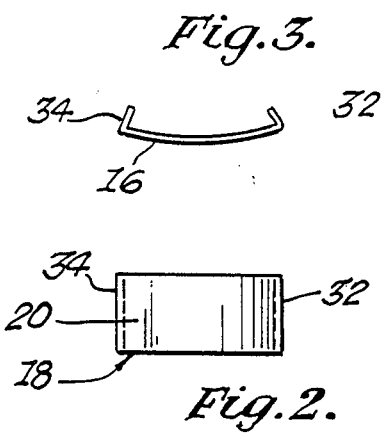
Fig.3.
Fig.2.
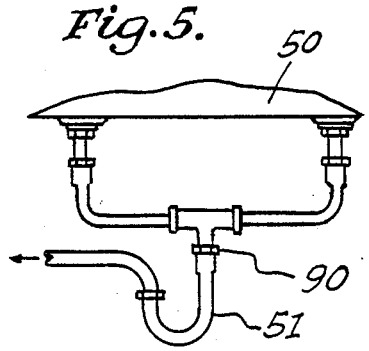
Fig.5.
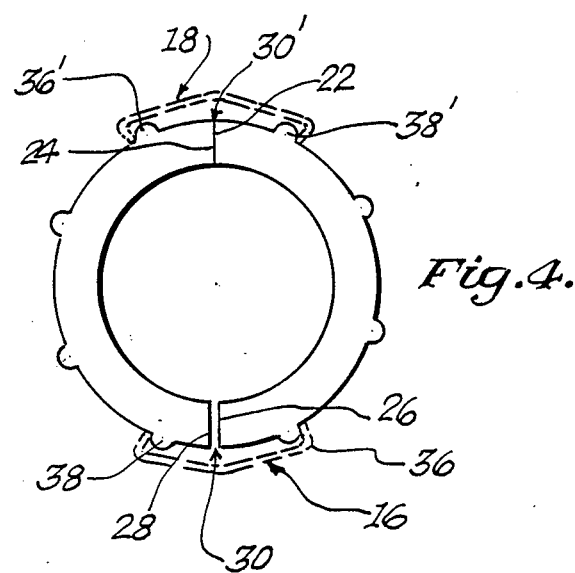
Fig.4.
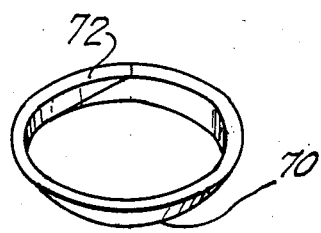
Fig.6.
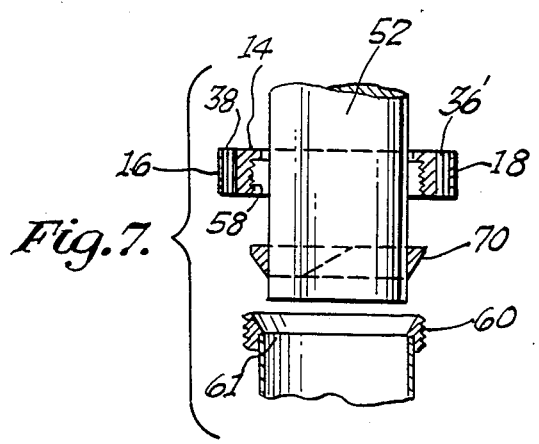
Fig.7.

THREADED SPLIT COUPLING NUT

BACKGROUND OF THE INVENTION

Various forms of plumbing joints utilize internally threaded nuts. Such nuts regularly become broken or corroded to the extent that they must be replaced. Replacement of threaded nuts, generally, requires the removal of adjacent pipe sections or fittings to enable a peripherally continuous replacement slip nut to be applied over an associated pipe section. Such removal of a pipe section or fitting is time consuming and often results in unwanted "down time" of the related plumbing section. Accordingly, a need exists for structure enabling the ready replacement of broken or corroded slip nuts.

In the past many threaded split-type coupling nuts have been disclosed in U.S. Patents such as Patent Nos. 944,877; 4,226,164 and 4,258,944.

However, these previously known forms of split coupling nuts, while being installable, are not constructed in a manner facilitating use of inexpensive production nuts. Such previous split coupling nuts provide a threaded split coupling nut operative in substantially the same manner as a conventional peripherally continuous coupling nut with a new production step of splitting the coupling nut and adding complex connector means.

The threaded split coupling nut is useful for plumbing traps when constructed in the form of a threaded split-slip nut coupling such as used under a sink as disclosed in U.S. Pat. No. 4,258,944. The invention in U.S. Pat. No. 4,258,944 is disclosed and is made a part hereof. When access to the sink trap is desired for cleaning purposes as well as repair purposes, the threaded split coupling nut allows the plumber to avoid the necessity of dismantling the entire installation as is required with conventional coupling nuts.

SUMMARY OF THE INVENTION

The new and improved threaded split coupling nut system disclosed herein is designed for general coupling use as well as for quick uncoupling and coupling of plumbing drain systems. The improved threaded split coupling nut system provides a practical yet inexpensive system. The threaded split coupling nut system includes a threaded split coupling nut and coupling means in the form of two clamps. The threaded split-slit nut coupling shown in the drawing has conventional nut shape but has to be split and incorporated in the disclosed system. The gripping nodules on the body are positioned parallel to the rotational center line of the split-slip nut coupling. The gripping nodules are formed as an integral part of the conventional and old slip nut coupling design. The gripping nodules are connected to or formed on the outside surface of the threaded split-slip nut coupling and the gripping nodules project outward in a radial direction from the rotational center line of the split-slip nut coupling. The conventional threaded split-slip nut coupling has been divided into two equal parts along a plane containing the rotational center line. The split-slip nut coupling may be cut by a hot wire or a divider may be placed in the mold used in the injection molding machine to create the split-slip nut coupling disclosed herein. The space between the two halves of the split nut has been found to not interfere in the operative usefullness of the split-slip nut couplings when used with the disclosed clamps. The space may be filled and is non-existant when each half of the split-slip nut is molded separately.

Each of the clamps have a body in the form of an article. Each clamp has connecting means on opposite ends of the clamp body. A first generally C-shaped distal end is located on one end of the body and a second distal end in the shape of a mirror image of the first generally C-shaped distal end is located on the opposite end of the body. When viewed from the top a clamp has one C-shaped distal end and a mirror image of that C-shaped distal end at the opposite end. The clamps may be made from flat band spring steel, stainless steel or other such material. The body of each clamp spans two adjacent gripping nodules on opposite sides of the split line. The C-shaped end and the mirror image end are positioned on and connected to the opposite sides of the base of the gripping nodules. The C-shaped end and the mirror image end of each clamp is positioned on different halves of the split-slip nut coupling in order to bridge the split on both sides and to hold the split-slip nut coupling together.

The main object of this invention is to provide a split threaded split-slip nut coupling of conventional shape but having the nut split in two halves and constructed in a manner whereby it may be used in substantially the same manner as a continuous slip nut when the half sections thereof are releasably engaged with each other by an improved non-complex coupling.

Another object of this invention is to provide a threaded split-slip nut coupling constructed in a manner whereby it may be readily mass produced at a low cost from existing molds or existing molds with dividers between two equal halves.

Another important object of this invention is to provide a split threaded coupling nut including half sections thereof which may be readily releaseably connected with each other for use as a unitary threaded slip nut by noncomplex clamps. A further object is to provide for a split slip nut or non-complex clamp having a flat spring body with a C-shaped end and the mirror image shaped end.

An additional object of this invention to be specifically enumerated herein is to provide a threaded split-slip nut couling in accordance with the preceding objects and which will conform to conventional forms of manufacture, and use two clamps of non-complex constructions and the system is easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

In the drawings:

FIG. 1 is an isometric view of the threaded split-slip nut coupling and clamp in a connected configuration.

FIG. 2 is a side view of a clamp.

FIG. 3 is a top view of the clamp in FIG. 2.

FIG. 4 is a partial top view of the coupling nut and the clamps in phanthom.

FIG. 5 is an elevation of a sink and trap.

FIG. 6 is a perspective view of a seal.

FIG. 7 is an elevation showing the invention just prior to final assembly.

DESCRIPTION OF THE PREFERRED EMBODIMENT

Referring now to the drawings FIGS. 1 through 4 shows a quickly engageable-quickly releaseable split-slip nut coupling and clamp system 10 in FIG. 1. The system includes a two part split-slip nut coupling 12 and 14 and a pair of clamps 16 and 18. Each clamp has a body 20 in FIG. 2 with connecting means 32 and 34 having a generally C-shaped configurations. The split-slip nut 11 is divided in half as members 12 and 14 and the two adjacent faces 22 and 24 shown in FIG. 4 at one dividing junction and the other two adjacent faces 26 and 28 at the other junction are placed near one another or together in face to face contact. The two clamps 16 and 18 are placed over the junction opening 30 and 30' respectively. The connecting means shown in phanthom 16 and 18 are positioned over the nodules 36 and 38 as well as 36' and 38' as illustrated in FIGS. 1 and 4 and moved downward in the direction of the arrow A in FIG. 1 to secure the two halves of the split-slip nuts together. The two halves are separated by moving the connecting means in the opposite direction as arrow A.

The split-slip nut coupling may be manufactured by cutting and removing material from the standard circular plastic coupling nut. The split-slip nut is held together by the clamps and the removed material spaces 30 and 30' are maintained by the pipe threads upon which the split-slip nut coupling is screwed over as shown in FIG. 7.

Referring now to the drawings in FIGS. 5, 6 and 7, there is shown for illustrative purposes, one type of trap assembly which exists below a sink 50, the trap assembly including a P-trap 51 in the form of a generally J-shaped tube or pipe which receives a tailpiece which is a tube or pipe 52, and which is secured in tube 51 by means of a known slip nut 90. Between tubes 52 and 51, there is a known seal, shown in FIG. 6, which is compressed between the pipes 52 and 51 in sealing engagement by means of slip nut 90 which is threaded on a sleeve fixed to the upper end of trap tube 51. Other similar couplings are shown generally at B and C.

Referring now to FIGS. 1 and 7, there is shown a part of one preferred embodiment of the present invention which is a split-slip nut generally designated 10 that is a substitute for a conventional unsplit slip nut. The split-slip nut 10 of the present invention is a split-slip nut formed in two generally semicircular sections 12 and 14 from a known slip nut configuration. The other peripheral surfaces thereof being provided with a circular surface with projecting nodules such as 36 and 38 shown in the FIGS. 1, 4 and 7. The nodules in the regular split-slip nut are for engagement by hand or by a suitable wrench for use in tightening or untightening the slip nut. After the slip nut is split in accordance with this invention the nodules are also used as anchoring portions for the connectors 16 and 18. The internal surfaces of the split nut sections 12 and 14 are provided with threads 58 in FIG. 7 so that when joined as shown in FIG. 1, they define one continuous thread for purposes of engagement on corresponding complementary threads provided on the outer surface of a male sleeve 60 shown in FIG. 7. Male sleeve 60 which need not be split, is a conventional item and has a shoulder 61 is used for engagement over the upper end of trap tube 52.

Referring to FIG. 6, the assembly of the present invention further includes an old split seal 70 made of any suitable material such as neoprene and which is split along a degree incline at 72, thus enabling sections of the seal 70 to be separated from each other for placement of the seal in a lateral direction around the tubular members of the trap assembly without disengaging the trap assembly. Referring to FIG. 6, the direction of the split line 72 must be chosen in accordance with the direction of the threads 58 of the split nut sections such that the upper split portion of the seal points in the advancing direction of the threads such that when the split nut is advanced on the male sleeve 60 to secure the seal in place, the torque pressure exerted on the upper split portion of the seal will cause it to firmly be seated on the lower split portion, thus ensuring complete and continuous sealing engagement along the split line 72. The specific direction of split line 72 shown in FIG. 6 corresponds to right-handed threads of the splut nut.

FIG. 7 shows how the split-slip nut 10 after it is placed around the trap assembly 52 and 60 without removal of either of them is assembled for use. The member 14 is moved down with member 12 and connectors 16 and 18. The threads 58 are engaged on threads 60 and tightened.

The split-slip nut may be made cutting and leaving space 30 and 30' or special molds may be made so that no such spaces are present when the two parts are brought together.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A threaded split-slip coupling nut system comprising:
   a threaded split-slip coupling nut having threads and an outside surface and a plurality of spaced apart gripping screw down portions generally parallel to the rotational center line of said split-slip coupling nut and located on said outside side surface of said split-slip coupling nut;
   said split-slip coupling nut including two identical nut halves separated along a separation plane containing the rotational center line of said split-slip coupling nut and said separation plane positioned between adjacent said gripping screw down portions on opposite said nut halves on opposite sides of said separation plane;
   at least two clamping members each having an intermediate body portion having one side and an opposite side with a generally C-shaped distal end connecting means on said one side of said intermediate body portion and a second end having a generally mirror image of said generally C-shaped distal end connecting means on said opposite side, each said intermediate body portion connected to each said C-shaped distal end connecting means for spanning said separation plane and said adjacent gripping screw down portion on each side of said separation plane, said clamping members engageable with the opposite sides of adjacent said gripping screw down portions adjacent each said separation plane each said opposite sides of said gripping screw down portions acting in a dual function as gripping screw down means and as male connecting members for said clamping members.

2. A threaded split-slip coupling nut as set forth in claim 1, wherein:
said clamping members are movable parallel to said gripping screw down portions to engage and disengage said clamping members from said gripping screw down portions to connect and separate said split-slip coupling nut.

* * * * *